(12) United States Patent
Wang He

(10) Patent No.: US 8,979,350 B2
(45) Date of Patent: Mar. 17, 2015

(54) LIGHT GUIDE PLATE AND BACKLIGHT MODULE USING SAME

(71) Applicant: Hon Hai Precision Industry Co., Ltd., New Taipei (TW)

(72) Inventor: Li-Ying Wang He, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 91 days.

(21) Appl. No.: 13/711,866

(22) Filed: Dec. 12, 2012

(65) Prior Publication Data

US 2013/0163281 A1 Jun. 27, 2013

(30) Foreign Application Priority Data

Dec. 23, 2011 (TW) .................................. 100148440

(51) Int. Cl.
*F21V 5/02* (2006.01)
*F21V 8/00* (2006.01)

(52) U.S. Cl.
CPC ............ *G02B 6/0031* (2013.01); *G02B 6/0048* (2013.01); *G02B 6/0055* (2013.01)
USPC ............................ 362/625; 362/626; 362/339

(58) Field of Classification Search
CPC .. G02B 6/0048; G02B 6/0036; G02B 6/0038; G02B 6/0058; G02B 6/0045
USPC .................................................... 362/625, 626
See application file for complete search history.

(56) References Cited

U.S. PATENT DOCUMENTS

| 4,252,416 | A | * | 2/1981 | Jaccard | 349/65 |
| 5,584,556 | A | * | 12/1996 | Yokoyama et al. | 362/625 |
| 5,980,054 | A | * | 11/1999 | Fukui et al. | 362/625 |
| 6,747,801 | B2 | * | 6/2004 | Umemoto et al. | 359/599 |
| 7,056,005 | B2 | * | 6/2006 | Lee | 362/625 |

* cited by examiner

*Primary Examiner* — Peggy Neils
(74) *Attorney, Agent, or Firm* — Novak Druce Connolly Bove + Quigg LLP

(57) ABSTRACT

A light guide plate includes an incident surface, an emitting surface, and a reflecting surface opposite to the emitting surface. The incident surface connects the emitting surface to the reflecting surface. A plurality of microstructures is defined in the reflecting surface. Each microstructure is a slot. A cross-section across each microstructure and parallel to a light emitting direction is substantially V-shaped. Each microstructure is formed with two sidewalls. Each sidewall includes a plurality of stepped portions connected in order.

12 Claims, 4 Drawing Sheets

LIGHT GUIDE PLATE AND BACKLIGHT MODULE USING SAME

BACKGROUND

1. Technical Field

The present invention generally relates to light guide plates, and more particularly to a light guide plate for use in a backlight module.

2. Description of the Related Art

A light guide plate is a key component of the backlight module, for guiding light emitted from a point light source or a linear light source to emit through a plane. The light guide plate generally includes an incident surface facing the light source, an emitting surface located at a top thereof, and a reflecting surface opposite to the emitting surface. A plurality of microstructures, such as a plurality of V-shaped microstructures defined in the reflecting surface, enhances a light energy utilization rate and an optical uniformity of the backlight module. However, a light emitting angle in front of the light emitting surface is relatively narrow.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
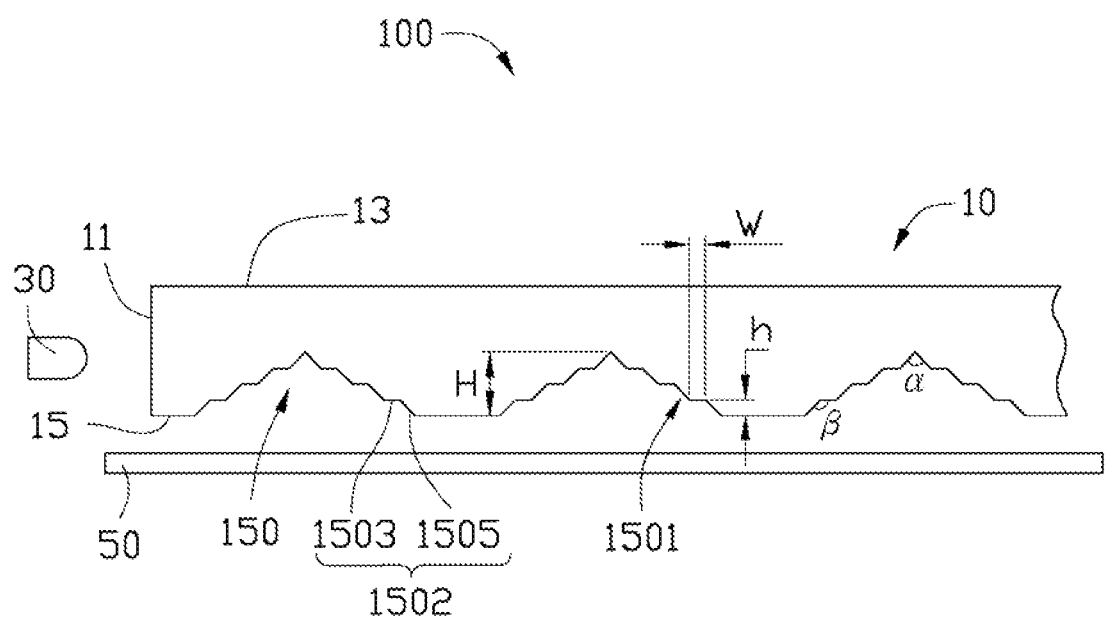
FIG. 1 is a partial, cross-sectional view of a first embodiment of a backlight module including a light guide plate.

FIG. 1 shows a first embodiment of a backlight module 100. The backlight module 100 includes a light guide plate 10, a light source 30, and a reflecting plate 50.

The light guide plate 10 is a substantially rectangular sheet, and includes an incident surface 11, an emitting surface 13, and a reflecting surface 15 opposite to the emitting surface 13. The incident surface 11 interconnects the emitting surface 13 and the reflecting surface 15. Light enters inside the light guide plate 10 through the incident surface 11, and exits from the emitting surface 13 reflected by the reflecting surface 15. A plurality of microstructures 150 is defined in the reflecting surface 15, facing the reflecting plate 50. The plurality of microstructures are substantially parallel to each other. Each microstructure 150 is a slot. A cross-section across each microstructure 150 and perpendicular to the light incident surface 11 is substantially V-shaped. Each microstructure 150 is formed with two sidewalls 1501 symmetrically with each other. Each sidewall 1501 includes a plurality of stepped portions 1502 connected in order. Each stepped portion 1502 includes a flat surface 1503 and an inclined surface 1505 connected with the flat surface 1503.

In the illustrated embodiment, an apex angle α of the microstructure 150 is substantially 90 degrees. A plurality of flat surfaces 1503 of the plurality of stepped portions 1502 is substantially parallel to each other. A plurality of inclined surfaces 1505 of the plurality of stepped portions 1502 is substantially parallel to each other. An intersection angle β defined by the flat surface 1503 and the inclined surface 1505 of each stepped portion 1502 is about 135 degrees. The widths w of the flat surfaces 1503 of each stepped portion 1502 along a direction perpendicular to a light emitting direction are substantially the same. The width w of the flat surface 1503 is about 0.5 μm. The first heights h of the inclined surfaces 1505 of each stepped portion 1502 along the light emitting direction are substantially same. The first height h of the inclined surface 1505 is about 0.5 μm. A second height H of each microstructure 150 along the light emitting direction is substantially 2.0 μm. In other words, each sidewall 1501 of the corresponding microstructure 150 includes four stepped portions 1502. In other embodiments, the apex angle α, the intersection angle β, the width w, the first height h, the second height H, and the quantity of the stepped portions 1502 of each microstructure 150 can be changed as needed.

The light source 30 is positioned adjacent to the incident surface 11 of the light guide plate 10. The reflecting plate 50 is positioned below the reflecting surface 15 of the light guide plate 10, thereby reflecting light inside the light guide plate 10.

Figure 2:
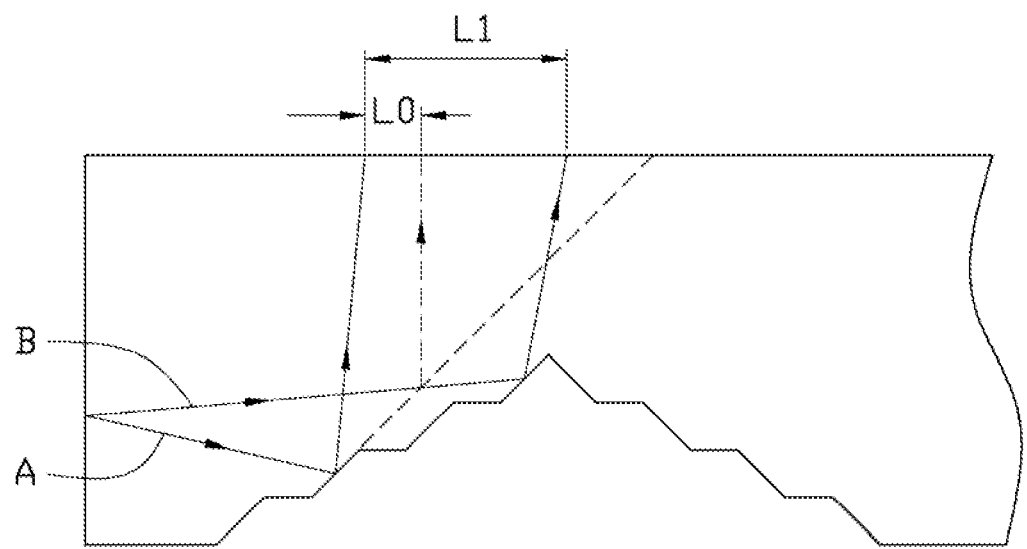
FIG. 2 illustrates two light paths of light beam A and light beam B in the light guide plate of FIG. 1 and in a conventional light guide plate.

In use, light emitted from the light source 30 enters inside the light guide plate 10, and then a part of the light emits from the emitting surface 13 is reflected and condensed by the microstructures 150. FIG. 2 shows a first light path of light beam A and light beam B reflected by two inclined surfaces 1505 defined by a solid line, and a second light path reflected by a V-shaped microstructure with a flat sidewall defined by a dotted line. A first emitting width L1 is formed when light beam A and light beam B emit along the first light path, and a second emitting width L0 is formed when light beam A and light beam B emit along the second light path. The first emitting width L1 is wider than the second emitting width L0, as shown in FIG. 2. In other words, a light emitting angle in front of the emitting surface 13 of the backlight module 100 is relatively wide. In addition, the light facing the reflecting surface 15 can be reflected by the flat surfaces 1503, and thereby an emitting path is shortened. Thus, a light energy utilization rate and a light emitting intensity in front of the emitting surface 13 are enhanced.

Figure 3:
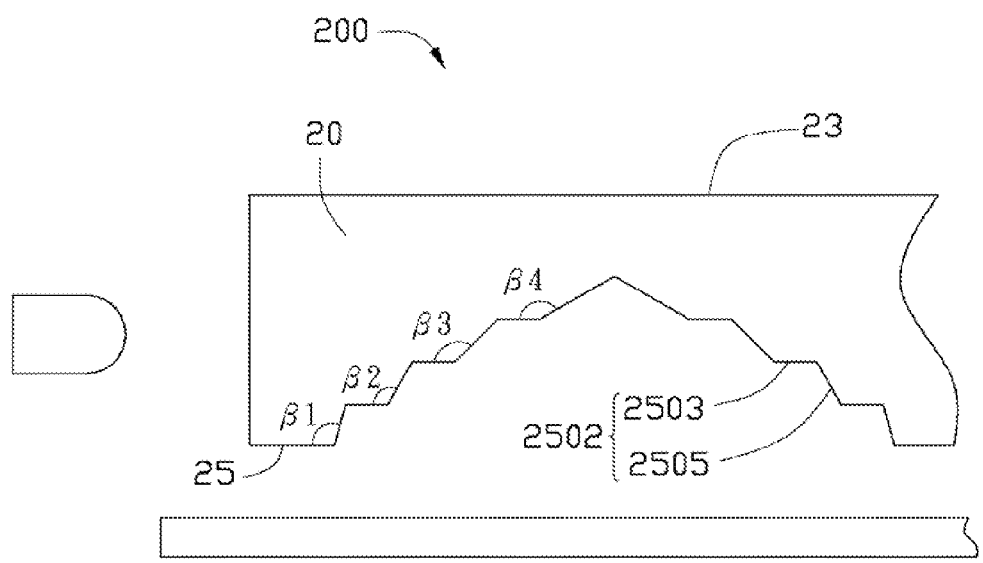
FIG. 3 is a partial, cross-sectional view of a second embodiment of a backlight module.

FIG. 3 shows a second embodiment of a backlight module 200. The backlight module 200 is substantially the same as the first embodiment of the backlight module 100, except that intersection angles β between a flat surface 2503 and a corresponding inclined surface 2505 of each stepped portion 2502 progressively increase along a direction away from a reflecting surface 25. In an illustrated embodiment, intersection angles β1, β2, β3, and β4 along the direction away from a reflecting surface 25 are about 95 degrees, 105 degrees, 120 degrees, and 135 degrees, respectively. In other embodiment, the intersection angles β1, β2, β3, and β4 can be changed as needed. The intersection angle between a flat surface 2503 and a corresponding inclined surface 2505 of each stepped portion 2502 can also progressively decrease along a direction away from a reflecting surface 25.

Figure 4:
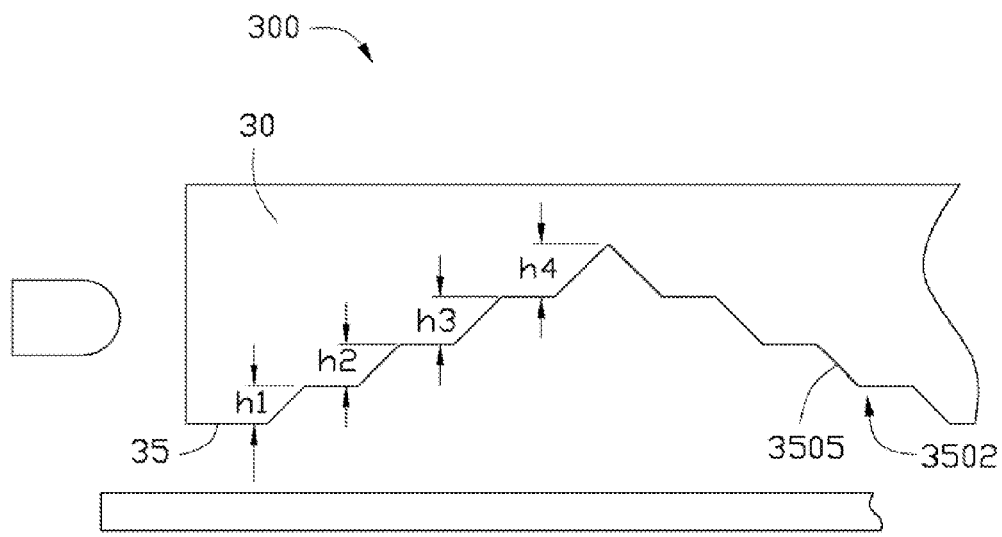
FIG. 4 is a partial, cross-sectional view of a third embodiment of a backlight module.

FIG. 4 shows a third embodiment of a backlight module 300. The backlight module 300 is substantially the same as the first embodiment of the backlight module 100, except that the first heights of inclined surfaces 3505 of a plurality of stepped portions 3502 progressively increase along a direction away from a reflecting surface 35. In an illustrated embodiment, the first heights h1, h2, h3, and h4 along the direction away from a reflecting surface 35 are about 0.3 μm, 0.4 μm, 0.5 μm, and 0.6 μm, respectively. In other embodiment, the heights h1, h2, h3, and h4 can be changed as needed. The heights can also progressively decrease along a direction away from a reflecting surface 35.

It is to be understood, however, that even through numerous characteristics and advantages of the disclosure have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A light guide plate, comprising:
    an emitting surface;
    a reflecting surface opposite to the emitting surface; and
    an incident surface interconnecting the emitting surface and the reflecting surface, wherein a plurality of microstructures is defined in the reflecting surface, each microstructure is a slot, a cross-section across each microstructure and perpendicular to the incident surface is substantially V-shaped, each microstructure is formed with two sidewalls, the two sidewalls of each microstructure portion are symmetrical with each other, each sidewall comprises a plurality of stepped portions connected in order, each stepped portion comprises a flat surface and an inclined surface connected with the flat surface, a plurality of flat surfaces of the plurality of stepped portions is substantially parallel to each other, and a plurality of inclined surfaces of the plurality of stepped portions is substantially parallel to each other.

2. The light guide plate of claim 1, wherein an apex angle of each microstructure is about 90 degrees, and an intersection angle defined by the flat surface and the inclined surface of each stepped portion is about 135 degrees.

3. The light guide plate of claim 1, wherein widths of the flat surfaces of each stepped portion along a direction perpendicular to a light emitting direction are substantially the same, and heights of the inclined surfaces of each stepped portion along the light emitting direction are substantially the same.

4. The light guide plate of claim 3, wherein the width of each flat surface is about 0.5 μm, and the height of each inclined surface is substantially about 0.5 μm.

5. The light guide plate of claim 1, wherein heights of the inclined surfaces of each stepped portion along the light emitting direction progressively decrease or increase along a direction away from the reflecting surface.

6. The light guide plate of claim 1, wherein each stepped portion comprises a flat surface and an inclined surface connected with the flat surface, and intersection angles between the flat surface and a corresponding inclined surface adjacent to the flat surface of each stepped portion progressively increase or decrease along a direction away from the reflecting surface.

7. A backlight module, comprising:
    a light guide plate comprising:
        an emitting surface;
        a reflecting surface opposite to the emitting surface; and
        an incident surface interconnecting the emitting surface and the reflecting surface, wherein a plurality of microstructures is defined in the reflecting surface, each microstructure is a slot, a cross-section across each microstructure and perpendicular to the incident surface is substantially V-shaped, each microstructure is formed with two sidewalls, the two sidewalls of each microstructure portion are symmetrical with each other, each sidewall comprises a plurality of stepped portions connected in order, each stepped portion comprises a flat surface and an inclined surface connected with the flat surface, a plurality of flat surfaces of the plurality of stepped portions is substantially parallel to each other, and a plurality of inclined surfaces of the plurality of stepped portions is substantially parallel to each other;
    a light source positioned adjacent to the incident surface; and
    a reflecting plate positioned below a side of the reflecting surface of the light guide plate away from the emitting surface.

8. The backlight module of claim 7, wherein an apex angle of each microstructure is about 90 degrees, and an intersection angle between the flat surface and the inclined surface of each stepped portion is about 135 degrees.

9. The backlight module of claim 7, wherein widths of the flat surfaces of each stepped portion along a direction perpendicular to a light emitting direction are substantially the same, and heights of the inclined surfaces of each stepped portion along the light emitting direction are substantially the same.

10. The backlight module of claim 7, wherein the width of each flat surface is about 0.5 μm, and the height of each inclined surface is about 0.5 μm.

11. The backlight module of claim 7, wherein heights of the inclined surfaces of each stepped portion along the light emitting direction progressively decrease or increase along a direction away from the reflecting surface.

12. The backlight module light of claim 7, wherein each stepped portion comprises a flat surface and an inclined surface connected with the flat surface, and intersection angles between the flat surface and a corresponding inclined surface adjacent to the flat surface of each stepped portion progressively increase or decrease along a direction away from the reflecting surface.

* * * * *